US010159033B2

(12) United States Patent
Kotecha et al.

(10) Patent No.: US 10,159,033 B2
(45) Date of Patent: Dec. 18, 2018

(54) SYSTEM AND METHOD FOR CONTROLLING USAGE OF PRIORITY ACCESS IN NETWORKS

(71) Applicant: Verizon Patent and Licensing Inc., Arlington, VA (US)

(72) Inventors: Lalit R. Kotecha, San Ramon, CA (US); Suzann Hua, Walnut Creek, CA (US); Brian Olson, Clayton, CA (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/413,620

(22) Filed: Jan. 24, 2017

(65) Prior Publication Data

US 2018/0213466 A1    Jul. 26, 2018

(51) Int. Cl.
*H04W 4/00* (2018.01)
*H04W 48/02* (2009.01)
*H04L 29/08* (2006.01)
*H04W 8/04* (2009.01)
*H04W 60/04* (2009.01)

(52) U.S. Cl.
CPC ............ *H04W 48/02* (2013.01); *H04L 67/22* (2013.01); *H04W 8/04* (2013.01); *H04W 60/04* (2013.01)

(58) Field of Classification Search
CPC ............ H04W 72/048; H04W 76/046; H04W 36/0022; H04W 48/18; H04W 76/14; H04W 8/005; H04W 12/06; H04W 84/042; H04W 76/023; H04L 69/24
See application file for complete search history.

(56) References Cited

U.S. PATENT DOCUMENTS

| 2012/0051235 | A1* | 3/2012 | Kotecha | H04W 76/50 370/252 |
| 2013/0279330 | A1* | 10/2013 | Feng | H04W 48/06 370/230 |
| 2016/0278096 | A1* | 9/2016 | Watfa | H04W 28/0205 |
| 2017/0086186 | A1* | 3/2017 | Shuai | H04W 72/048 |
| 2017/0374611 | A1* | 12/2017 | Pragada | H04L 69/24 |

* cited by examiner

*Primary Examiner* — Idowu O Osifade (57) ABSTRACT

A system and method may include receiving information for a number of user equipment (UE) devices, wherein the information identifies a category associated with network access priority for each of the UE devices. The system and method may also include receiving, on behalf of a first one of the UE devices, a message to establish a network connection corresponding to a request for prioritized network access and determining whether a category for the first UE device allows for prioritized network access. The system and method may further include allowing prioritized network access to the first UE device, in response to determining that the category for the first UE device allows for prioritized network access and denying prioritized network access to the first UE device in response to determining that the category for the first UE device does not allow for prioritized network access.

20 Claims, 9 Drawing Sheets

SYSTEM AND METHOD FOR CONTROLLING USAGE OF PRIORITY ACCESS IN NETWORKS

BACKGROUND INFORMATION

Wireless broadband networks provide user devices with prioritized access to radio resources for certain use cases. For example, in accordance with the 3rd Generation Partnership Project (3GPP) standard, narrow band user devices may request prioritized allocation of radio resources by specifying mobile originating (mo)-Exception Data in a Radio Resource Control (RRC) Connection Request message transmitted from a user device to an evolved Node B (eNB). Network elements may then prioritize resource allocation based on the mo-Exception Data parameter being set in the RRC Connection Request message. However, frequent use of mo-Exception Data by user devices requesting prioritized access may prevent other user devices/equipment from accessing a wireless network. That is, with the increasing use of Internet of Things (IoT) devices (e.g., machine type communication (MTC) devices) that communicate over wireless networks, providing network access for all of the devices requesting both prioritized access and non-prioritized access has become difficult.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to controlling prioritized access to network resources. In an exemplary implementation, prioritized access to network resources are controlled to provide enhanced scheduling of resources, as well as to potentially reduce bandwidth and reduce message traffic in a network. For example, in one implementation, user devices are registered in accordance with one or more modes or categories of expected operation. The modes of operation correspond to different categories of allowing/denying prioritized network access to user devices. The modes of operation/categories essentially create profiles for each user device that can be used to determine whether prioritized access is permitted. For example, when a user device requests prioritized network access, one or more network elements determine whether to allow the prioritized access based on the registered mode/stored profile information. In this manner, prioritized network access can be controlled and limited, when appropriate. In addition, by identifying the number of user devices permitted to receive prioritized network access and how often they are permitted to receive prioritized network access, a network service provider may more easily determine expected overall network usage, plan for network expansion, as well as reduce network congestion and increase network capacity. Further, by tracking user devices' usage, a network can offer services for user devices that more closely mirror the actual usage patterns for the particular user devices, as well as protect a network from intentional or mistaken use of prioritized network access requests.

Figure 1:
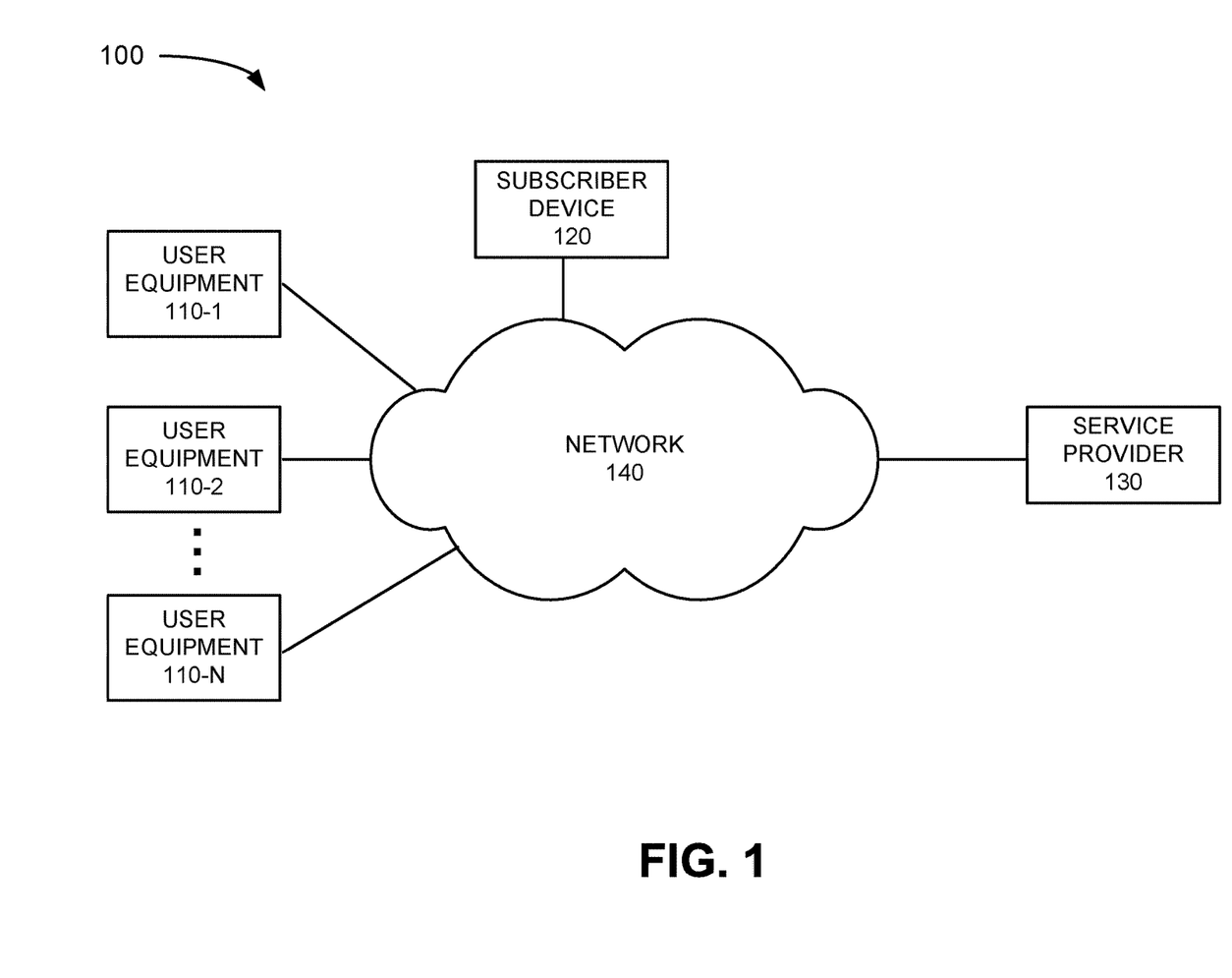
FIG. 1 illustrates an exemplary environment in which systems and methods described herein may be implemented.

FIG. 1 is a block diagram of an exemplary environment 100 in which systems and methods described herein may be implemented. Environment 100 may include user equipment (UE) 110-1 through 110-N, subscriber device 120, service provider 130 and network 140.

UEs 110-1 through 110-N (individually referred to as UE 110-x, UE 110 or UE device 110, and collectively as UEs 110 or UE devices 110) may include a mobile device, such as wireless or cellular telephone device (e.g., a conventional cell phone with data processing capabilities), a smart phone, a personal digital assistant (PDA) that can include a radiotelephone, etc. UEs 110 may also include any type of mobile computer device or system, such as a personal computer (PC), a laptop, a tablet computer, a notebook, a netbook, a wearable computer (e.g., a wrist watch, eyeglasses, etc.), a game playing device, a music playing device, a home appliance device, a home monitoring device, etc., that may include communication functionality.

UEs 110 may further include IoT devices, such as narrow band IoT devices operating in accordance with the standard developed by the 3rd Generation Partnership Project (3GPP), devices employing machine-to-machine (M2M) communication, such as Machine-Type Communication (MTC), a type of M2M communication standard developed by the 3GPP. In still other instances, UEs 110 may include connected cars, connected public transport systems, and/or other connected devices. Still further, UEs 110 may include MTC drones, stationary MTC devices, such as parking meters, sensors, home appliances, home monitoring systems, health monitoring devices, etc.

UEs 110 may connect to network 140 and other devices in environment 100 (e.g., subscriber device 120 and/or service provider 130) via any conventional technique, such as wired, wireless, optical connections or a combination of these techniques. UE 110 and the entity associated with UE 110 (e.g., the person holding or using UE 110) may be referred to collectively as UE 110 in the description below.

Subscriber device 120 may include one or more computing devices or systems associated with a subscriber or customer of network services provided by service provider 130. For example, subscriber device 120 may be a computer device associated with a customer of network services provided via network 140. Subscriber device 120 may be affiliated with one or more UEs 110 and may wish to register UEs 110 with service provider 130, as described in detail below. Subscriber device 120 and the entity associated with subscriber device 120 (e.g., the person using subscriber device 120) may be referred to collectively as subscriber device 120 and/or subscriber 120 in the description below.

Service provider 130 may include one or more computer devices and systems associated with providing wireless services via network 140. For example, service provider 130 may be an entity associated with operating network 140. Service provider 130 may store information regarding service plans for a large number of subscribers (also referred to herein as customers) and track data usage for each subscriber over a period of time (e.g., one month). Service provider 130 may also provide interfaces, such as graphical user interfaces (GUIs), application programming interfaces (APIs), etc., for allowing customers to register UE devices 110 for particular modes of operation. As an example, service provider 130 may provide an interface (e.g., a GUI) to subscriber device 120 that allows a home owner or business owner to register UE devices 110 in one or more modes or categories of use, such as "restricted," "controlled," or "open," as described in more detail below. These modes or categories allow service provider 130 to control prioritized access to network resources. Service provider 130 may communicate with elements of network 140 to control prioritized access to network resources, as described in more detail below.

Network 140 may include one or more wired, wireless and/or optical networks that are capable of receiving and transmitting data, voice and/or video signals. For example, network 140 may include one or more public switched telephone networks (PSTNs) or other type of switched network. Network 140 may also include one or more wireless networks and may include a number of transmission towers for receiving wireless signals and forwarding the wireless signals toward the intended destination. Network 140 may further include one or more satellite networks, one or more packet switched networks, such as an Internet protocol (IP) based network, a local area network (LAN), a wide area network (WAN), a personal area network (PAN), a long term evolution (LTE) network, a WiFi network, a Bluetooth network, an intranet, the Internet, or another type of network that is capable of transmitting data. Network 140 provides wireless packet-switched services and wireless Internet protocol (IP) connectivity to UEs 110 to provide, for example, data, voice, and/or multimedia services.

The exemplary configuration illustrated in FIG. 1 is provided for simplicity. It should be understood that a typical environment 100 may include more or fewer devices than illustrated in FIG. 1. For example, environment 100 may include a large number (e.g., thousands or more) of UEs 110 and subscriber devices 120 and multiple service providers 130. In addition, network 140 may include additional elements, such as eNBs, base stations, switches, gateways, routers, monitoring devices, etc., that aid in routing data and determining whether to grant prioritized access to network resources, as described in detail below.

In addition, various functions are described below as being performed by particular components in environment 100. In other implementations, various functions described as being performed by one device may be performed by another device or multiple other devices, and/or various functions described as being performed by multiple devices may be combined and performed by a single device.

Figure 2:
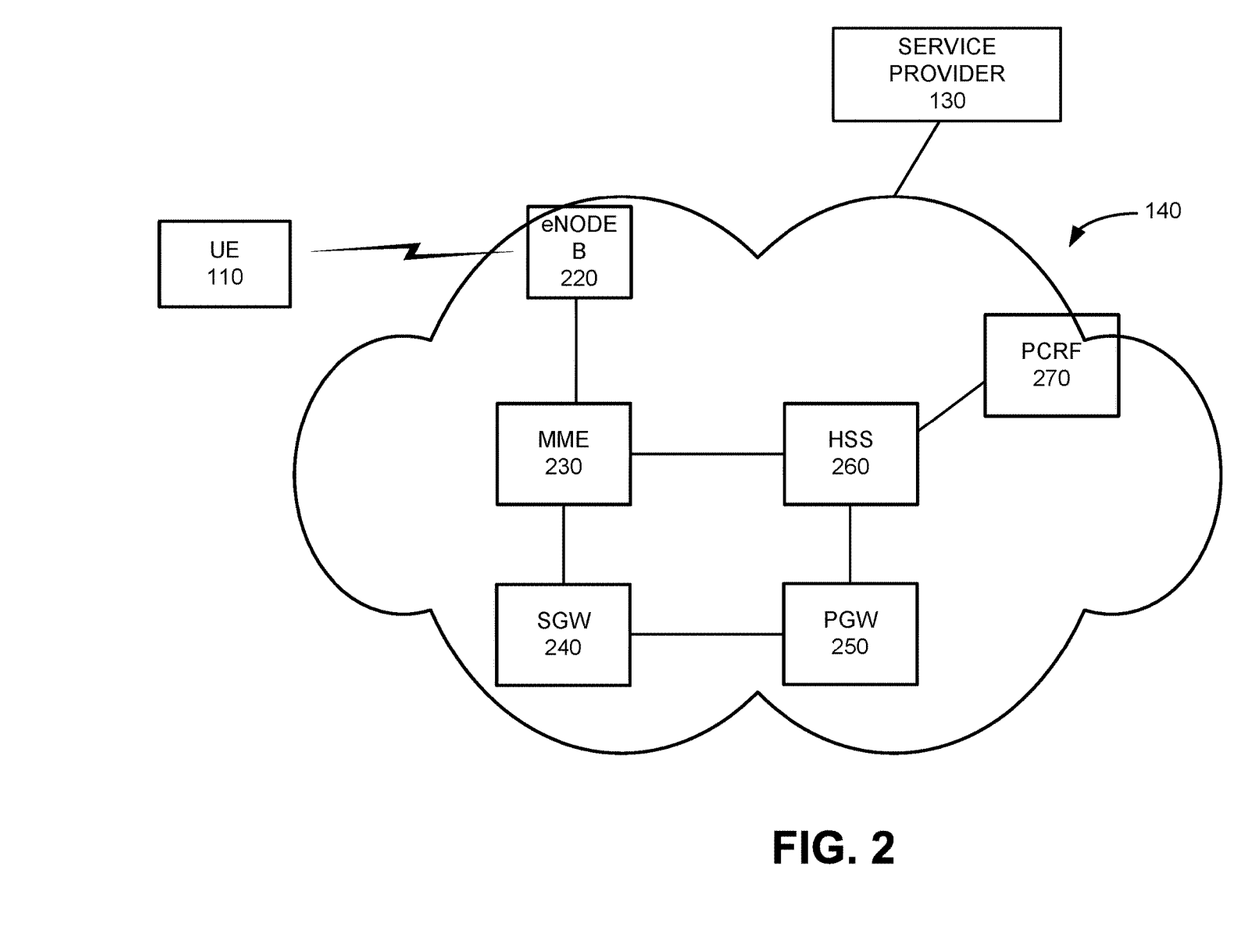
FIG. 2 illustrates an exemplary configuration of components implemented in a portion of the network of FIG. 1.

FIG. 2 is an exemplary block diagram illustrating a portion of network 140. In the implementation depicted in FIG. 2, network 140 is a long term evolution (LTE) network.

It should be understood, however, that embodiments described herein may operate in other types of wireless networks.

Network 140 may include an evolved packet core (ePC) that includes an evolved Node B (eNB) 220, mobile management entity (MME) 230, serving gateway (SGW) 240, packet gateway (PGW) 250, home subscriber server (HSS) 260 and policy charging rules function (PCRF) 270. eNB 220 may be part of an evolved Universal Mobile Telecommunications System (UMTS) Terrestrial Radio Access Network (eUTRAN).

eNB 220 may include one or more devices and other components having functionality that allow UEs 110 to wirelessly connect to network 140. eNB 220 may be associated with one or more cells/sectors. For example, each cell or sector in network 140 may include one or more radio frequency (RF) transceivers pointed in a particular direction.

eNB 220 may interface with MME 230. MME 230 may include one or more devices that implement control plane processing for network 140. For example, MME 230 may implement tracking and paging procedures for UEs 110, may activate and deactivate bearers for UEs 110, may authenticate respective users of UEs 110, and may interface with non-LTE radio access networks. A bearer may represent a logical channel with particular quality of service (QoS) requirements, and can be used in some embodiments to control packet flows as described herein. MME 230 may also select a particular SGW 240 for a particular UE 110. MME 230 may interface with other MME devices (not shown) in network 140 and may send and receive information associated with UEs 110, which may allow one MME 230 to take over control plane processing of UEs 110 serviced by another MME 230, if the other MME 230 becomes unavailable.

SGW 240 may provide an access point to and from UEs 110, may handle forwarding of data packets for UEs 110, and may act as a local anchor point during handover procedures between eNBs 220. SGW 240 may interface with PGW 250. PGW 250 may function as a gateway to a core network, such as a wide area network (WAN) (not shown) that allows delivery of Internet protocol (IP) services to UEs 110.

HSS 260 may store information associated with UEs 110 and/or information associated with users of UEs 110. For example, HSS 260 may store user profiles that include authentication and access authorization information. Each user/subscription profile may include a list of UEs 110 associated with the subscriptions as well as an indication of which UEs 110 are active (e.g., authorized to connect to network 140). HSS 260 may also store profile information corresponding to modes or categories of use for UEs 110, and whether UEs 110 are allowed to be granted prioritized network access, as described in detail below.

PCRF 270 may implement policy charging and rule functions, such as providing quality of service (QoS) requirements, bandwidth and/or charges for a particular service for UEs 110. PCRF 270 may determine how a certain service data flow will be treated, and may ensure that user plane traffic mapping and treatment is in accordance with a user's subscription profile.

Although FIG. 2 shows exemplary components of network 140, in other implementations, network 140 may include fewer components, different components, differently arranged components, or additional components than depicted in FIG. 2. For example, network 140 may include a large number of eNBs 220, MMEs 230, SGWs 240, PGWs 250 HSSs 260 and PCRFs 270. Additionally, or alternatively, one or more components of network 140 may perform functions described as being performed by one or more other components.

Figure 3:
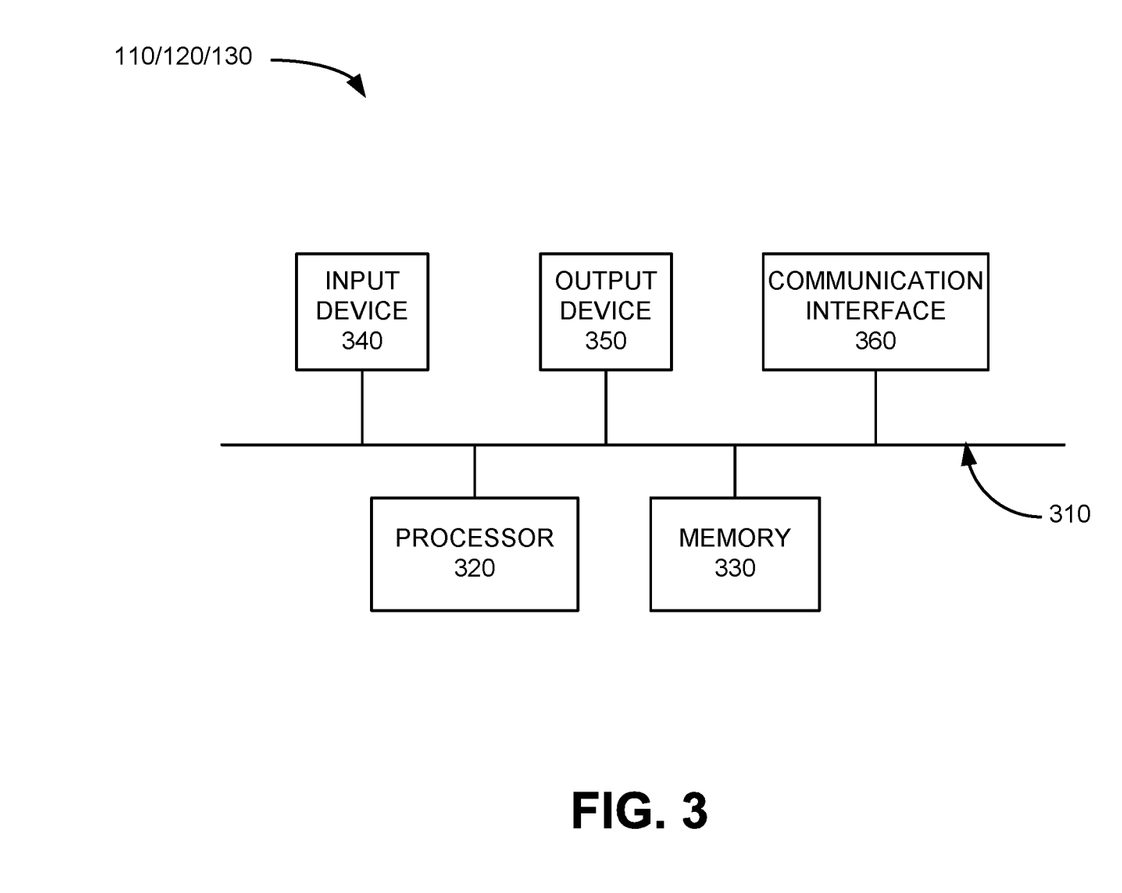
FIG. 3 illustrates an exemplary configuration of logic components included in one or more of the devices of FIG. 1 and FIG. 2.

FIG. 3 illustrates an exemplary configuration of UE 110. Other devices in environment 100, such as subscriber device 120 and network provider 130 may be configured in a similar manner. In addition, in some implementations, devices in network 140, such as MME 230, SGW 240, PGW 250, HSS 260 and PCRF 270 may be configured in a similar manner. Referring to FIG. 3, UE 110 may include bus 310, processor 320, memory 330, input device 340, output device 350 and communication interface 360. Bus 310 may include a path that permits communication among the elements of UE 110.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to UE 110, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, a touch screen display may act as both an input device and an output device.

Communication interface 360 may include one or more transceivers that UE 110 (subscriber device 120, service provider 130 or devices in network 140) uses to communicate with other devices via wired, wireless or optical mechanisms. For example, communication interface 360 may include one or more radio frequency (RF) transmitters, receivers and/or transceivers and one or more antennas for transmitting and receiving RF data via network 140. Communication interface 360 may also include a modem or an Ethernet interface to a LAN or other mechanisms for communicating with elements in a network, such as network 140 or another network.

The exemplary configuration illustrated in FIG. 3 is provided for simplicity. It should be understood that UE 110 (subscriber device 120, service provider 130 or devices in network 140) may include more or fewer devices than illustrated in FIG. 3. In an exemplary implementation, UE 110 (or other devices in environment 100) performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
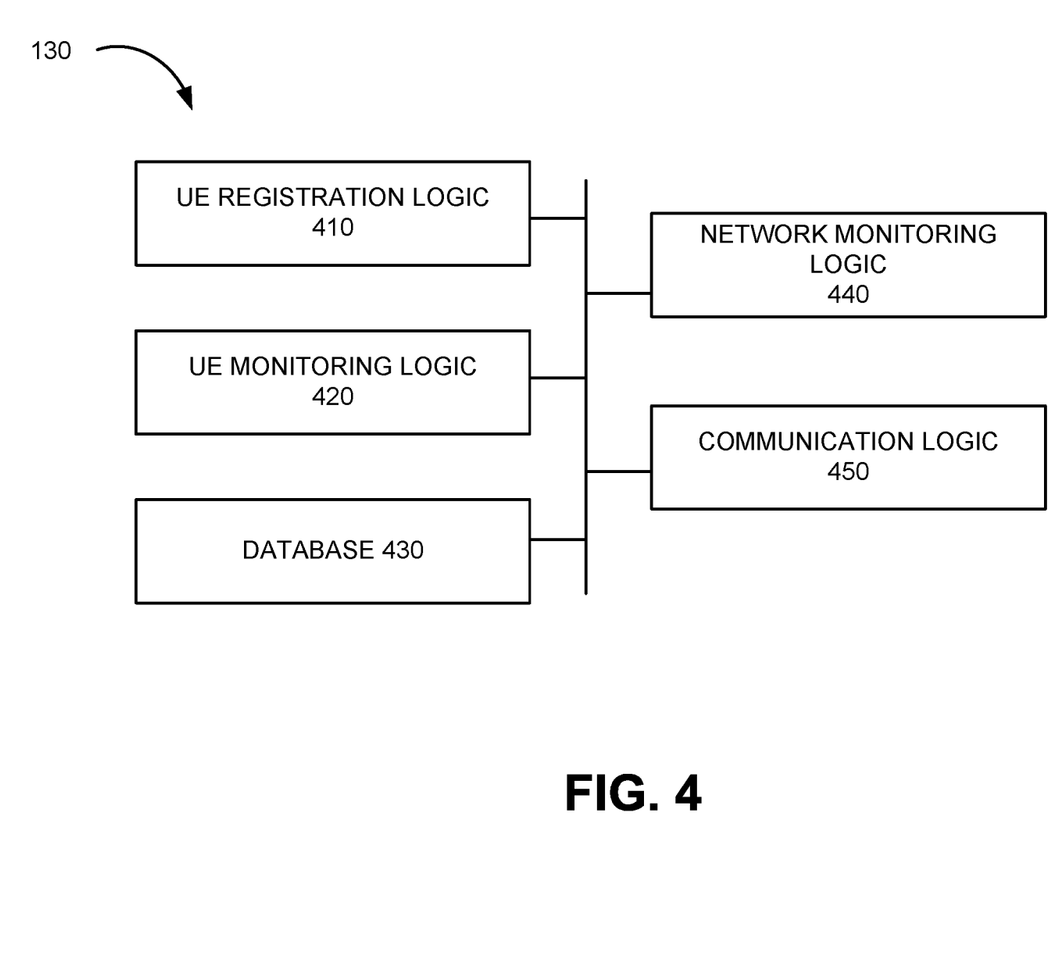
FIG. 4 illustrates an exemplary configuration of logic components implemented by one of the devices of FIG. 1.

FIG. 4 is an exemplary functional block diagram of components implemented in service provider 130. In an exemplary implementation, all or some of the components illustrated in FIG. 4 may be implemented by processor 320 executing software instructions stored in memory 330.

Service provider 130 may include user equipment (UE) registration logic 410, UE monitoring logic 420, database 430, network monitoring logic 440 and communication logic 450. In alternative implementations, these components or a portion of these components may be located externally with respect to UE 110, such as within one or more elements of network 140 (e.g., HSS 260).

UE registration logic 410 may include logic to allow subscribers to register UE devices 110 with service provider 130. In one implementation, UE registration logic 410 may include a number of interfaces (e.g., GUIs) that are provided to subscribers to facilitate an "on-boarding" or registration process for UE devices 110. For example, UE registration logic 410 may provide an interface for allowing subscribers to identify modes of use for each UE device 110 associated with that particular subscriber. In one implementation, the modes may be "restricted," "controlled," and "open," corresponding to expected modes of operation with respect to requesting prioritized access of network resources and the subscriber may enter or select the particular mode, as described in more detail below.

UE monitoring logic 420 may include logic to monitor whether UEs 110 are accessing network 140 in accordance with their respective modes of operation. For example, some UEs 110 may be registered as "controlled" devices that allow for a certain number of prioritized accesses to network 140 per period of time. UE monitoring logic 420 may determine whether UEs 110s exceed their allowed prioritized accesses.

Database 430 may includes one or more data storage devices that store one or more databases of information associated with network 140. For example, as described above, UE registration logic 410 may allow UEs to register for particular modes of operation. Database 430 may store information for each UE 110 in accordance with its registration information to create profiles for UEs 110. The profiles may be used by UE monitoring logic 420 to determine whether a UE 110 is operating in accordance with its profile.

Network monitoring logic 440 may include logic to determine parameters associated with network 140, such as the capacity of network 140, whether network 140 is overloaded, lightly loaded, etc. Network monitoring logic 440 may use the network loading information to determine whether UEs 110 can be granted access (e.g., prioritized access or normal access) to network resources. Network monitoring logic 440 may also use profile information associated with large numbers of UEs 110 (e.g., millions of UEs 110) to aid in determining future network load.

Communication logic 450 may include logic to allow service provider 130 to communication with other devices in environment 100, such as subscriber device 120 and elements of network 140. For example, communication logic 450 may provide profile information stored in database 430 to HSS 260 and/or other devices in network 140.

Although FIG. 4 shows exemplary components of service provider 130, in other implementations, service provider 130 may include fewer components, different components, differently arranged components, or additional components than depicted in FIG. 4. In addition, functions described as being performed by one of the components in FIG. 4 may alternatively be performed by another one or more of the components of service provider 130.

Figure 5:
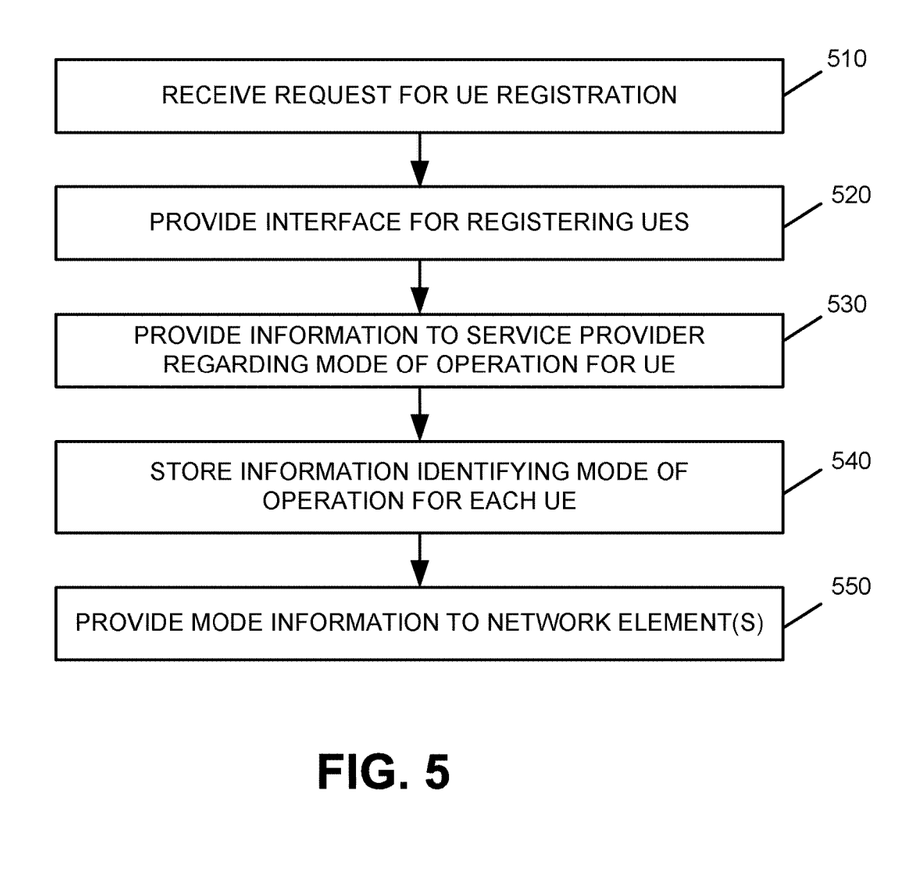
FIG. 5 is a flow diagram illustrating processing associated with registering user devices in accordance with an exemplary implementation.

FIG. 5 is a flow diagram illustrating exemplary processing associated with an entity, such as service provider 130, registering one or more UEs 110. Processing may begin with service provider 130 receiving a request for registering one or more UEs 110 (block 510). For example, a subscriber associated with subscriber device 120 (referred to collectively as subscriber 120 or subscriber device 120) may access service provider 130 to register one or more UEs 110 associated with subscriber 120. As an example, assume that subscriber 120 is a home owner and would like to register a number of IoT devices in his/her home that may access network 140, such as appliances, a thermostat, a security system, etc.

Service provider 130 receives the request and provides one or more interfaces for registering the UEs (block 520). For example, UE registration logic 410 may provide a graphical user interface (GUI) that allows a subscriber to easily enter information regarding each UE 110, such as the type of UE 110, the expected mode of operation for UE 110, etc. Subscriber 120 may then provide information to service provider 130 via the GUI(s) or other interfaces, which may include the mode of operation for each UE 110 to be registered (block 530).

For example, a subscriber may enter information via subscriber device 120 indicating that a UE 110 is a web-enabled refrigerator/MTC device that communicates with a central server at predetermined periods of time, and that the mode of operation is "restricted." The restricted mode may correspond to the UE 110 (i.e., the refrigerator in this example) being expected to never use mo-Exception Data to request prioritized access. Subscriber 120 may also enter information indicating another UE 110 is a home security monitoring system and that the mode of operation is "controlled." The controlled mode may correspond to UE 110 being expected to utilize mo-Exception Data only during certain times. For example, UE 110 (i.e., the home security monitoring system in this example) may be expected to utilize mo-Exception Data when UE 110 is an alarm/panic situation, such as when a home owner presses an alarm/panic button on the home monitoring system, or the home monitoring system detects a break-in. Subscriber 120 may further indicate that another UE 110 is a medical device monitoring a medical condition (e.g., a heart condition) of person in his/her home, and that the mode of operation is "open." The open mode may correspond to UE 110 being expected to utilize mo-Exception Data frequently or possibly every time UE 110 connects to network 140. In some instances, subscriber 120 may provide information regarding the type of device (e.g., refrigerator, home security system, medical device, thermostat, etc.) and service provider 130 may determine the appropriate mode based on the device type.

Service provider 130 may store the received information (block 540). For example, UE registration logic 410 may store the information identifying each UE 110 and its mode of operation in database 430. The information stored in database 430 will act as a profile for each UE 110, which may be used by service provider 130 and/or elements in network 140 to determine whether to grant prioritized access to network 140.

For example, service provider 130 may transmit profile information associated with each UE 110 stored in database 430 to HSS 260 (block 550). HSS 260 may then store the mode of operation information (e.g., restricted, controlled or open) for each UE 110 for subsequent use. For example, once a subscriber has registered his/her UEs 110, network 140 may handle connection requests in accordance with the stored information, as described in detail below.

Figure 6:
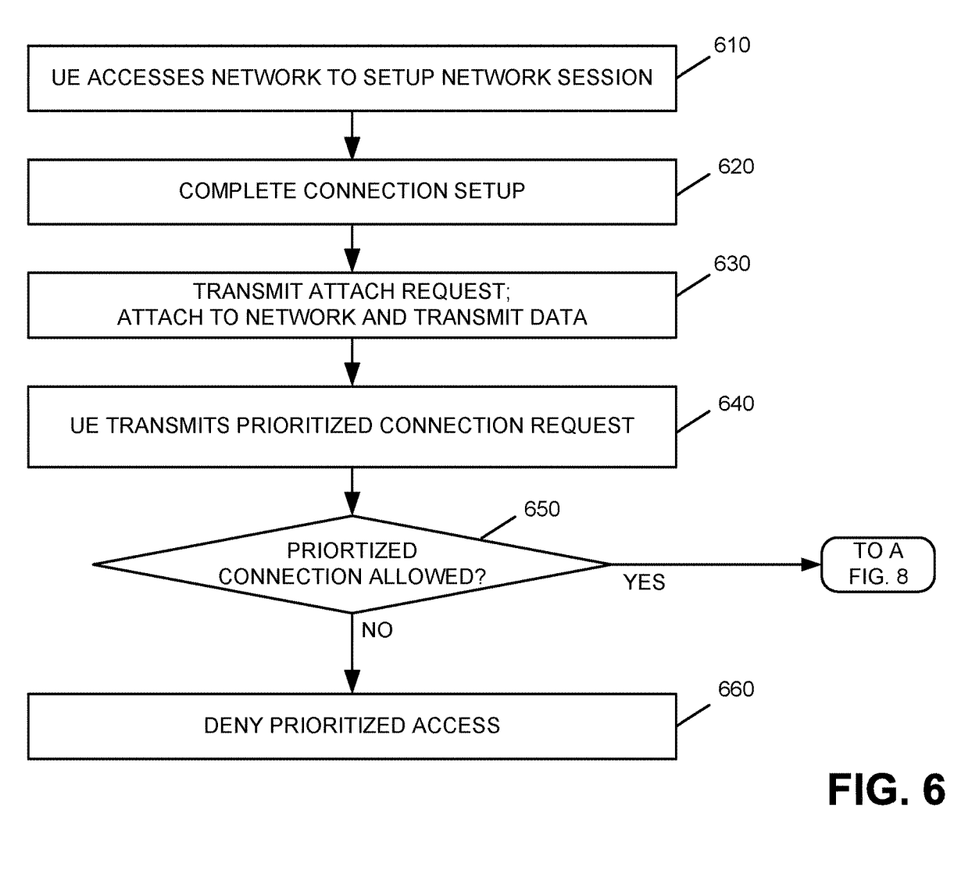
FIG. 6 is a flow diagram illustrating processing associated with requesting prioritized network access in accordance with an exemplary implementation.
Figure 7:
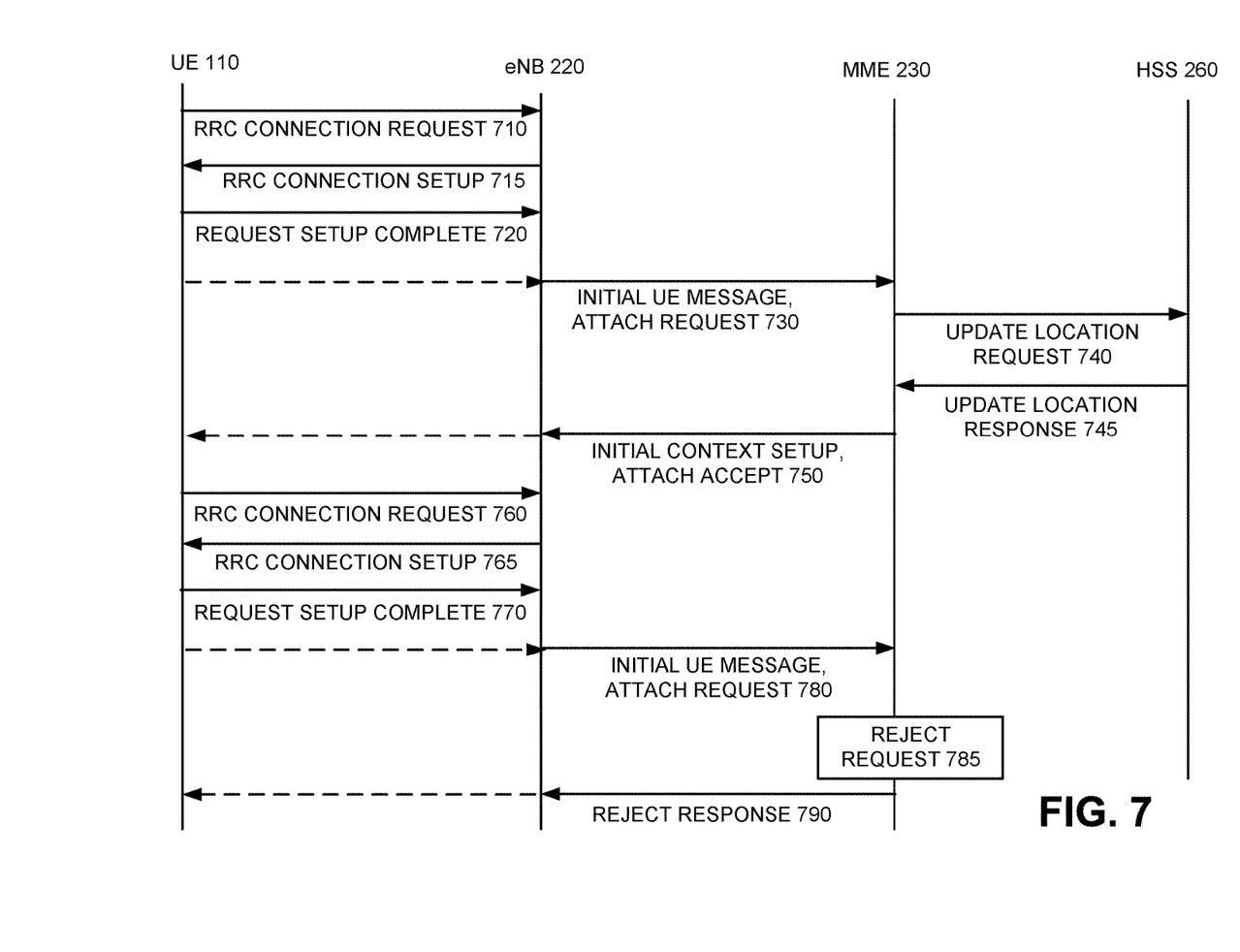
FIG. 7 is a signal flow diagram associated with the processing of FIG. 6.
Figure 8:
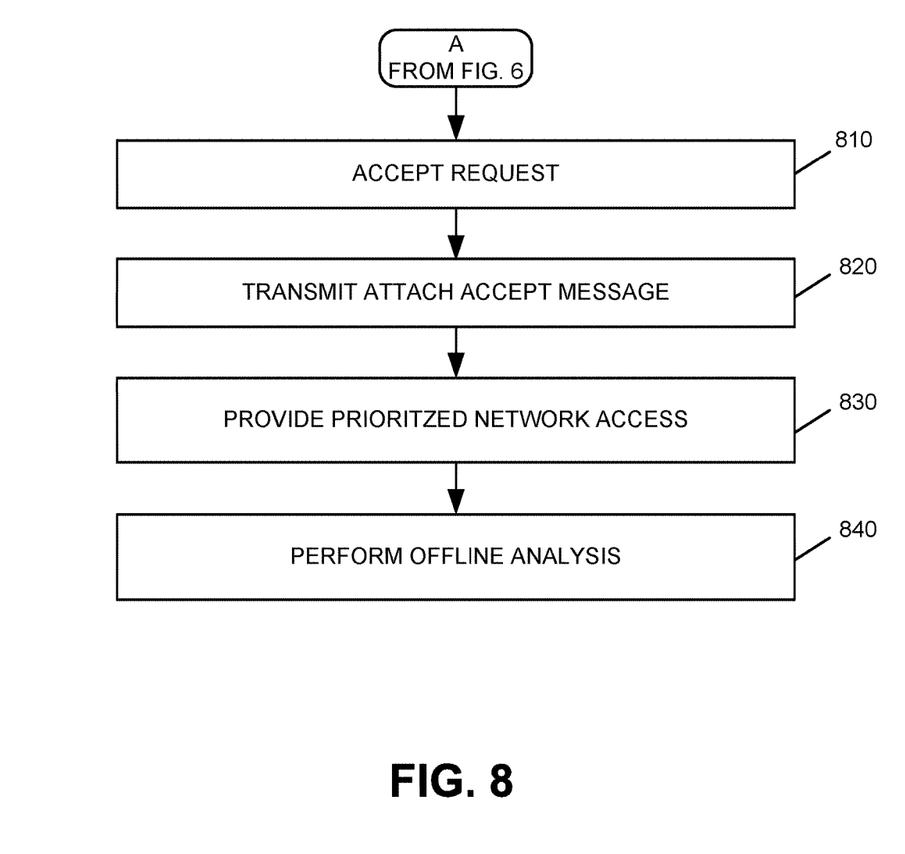
FIG. 8 is another flow diagram associated with requesting prioritized network access in accordance with an exemplary implementation.

FIGS. 6 and 8 are flow diagrams illustrating processing associated with UE 110 accessing network 140. The flow diagrams of FIGS. 6 and 8 are described in conjunction with the signal flow diagrams of FIGS. 7 and 9. Processing may begin with UE 110 accessing network 140 and attempting to setup a network session (block 610). For example, UE 110 may transmit a Radio Resource Control (RRC) Connection Request message to eNB 220 (FIG. 7, signal 710). The RRC Connection Request message may include information elements corresponding to the UE identity and an RRC Establishment Cause. Assume that the RRC Establishment Cause element/parameter in the RRC Connection Request corresponds to "mo-signaling." Mo-signaling indicates that UE 110 is requesting normal or standard access to network 140 and is not requesting prioritized access to network 140. eNB 220 may receive the Connection Request message and transmit an RRC Connection Setup message to UE 110 (FIG. 7, 715). Upon receiving RRC Connection setup message, assume that UE 110 responds by sending an RRC Setup Complete message to eNB 220, indicating that the RRC Connection setup is complete (block 620, FIG. 7, 720).

After the network connection is setup, UE 110 may transmit an S1 Application Protocol (AP) Initial UE message via eNB 220 that includes a non-access stratum (NAS) Attach Request to MME 230 (block 630; FIG. 7, 730). MME 230 receives the Attach Request and sends an update location request message to HSS 260 (FIG. 7, 740). HSS 260 may then update the location associated with UE 110 and transmit the Update Location Response to MME 230 (FIG. 7, 745). The Update Location Response may include subscription data and an International Mobile Subscriber Identity (IMSI) group ID. In accordance with an exemplary implementation, the Update Location Response message also includes information identifying the mode or category of operation with respect to prioritized access to network 140.

For example, in this case, assume that subscriber 120 registered UE 110 as a restricted mode device. Service provider 130, as described above, may forward information regarding registered UEs 110 to HSS 260 after service provider 130 completes its on-boarding or registration process for UEs 110 and HSS 260 may store the mode information as profiles for each UE 110. HSS 260 may then determine, based on profile information stored at HSS 260, that UE 110 was registered by subscriber 120 as a restricted device in which prioritized access is not allowed. HSS 260 may then include a mo-Exception Data parameter for restricted access in the Update Location Response message.

For example, HSS 260 may use a local-group-ID field included in the IMSI-group-ID informational element of the Update Location response message with a particular bit pattern indicating restricted access. As an example, setting bit 1 in the local-group-ID field may correspond to the open mode, setting bit 2 in local-group-ID field may correspond to the controlled mode and setting bit 3 in local-group-ID field may correspond to the restricted mode. In addition, other bits in the local-group-ID field may indicate a rate or percentage associated with prioritized access requests. For example, bit 4 in the local-group-ID field may indicate that a controlled mode device is permitted a particular rate or percentage of prioritized accesses and bits 5-7 in the local-group ID field may indicate the particular rate or percentage of prioritized accesses that are permitted (e.g., two prioritized connections per day are permitted, 25% of the network connections can be prioritized, etc.). Table 1 below illustrates exemplary bits in the local-group-ID field that may be set to identify the particular categories and rate/percentages, as discussed above.

TABLE 1

| Bits | Description |
|---|---|
| 1 | Open |
| 2 | Controlled |
| 3 | Restricted |
| 4 | Rate type - Rate or Percentage |
| 5-7 | Rate value |

In addition, the group-service-ID field in the IMSI-group-ID informational element of the Update Location response message may indicate that mo-Exception Data control is enabled, indicating that MME 230 will process requests for prioritized access based on the registered category or profile information for each UE 110. It should be understood that other fields or informational elements may be used to indicate the registered mode of operation (e.g., restricted, controlled, open) for UE 110, as well as the rate or percentage of prioritized network connections that are permitted, and that mo-Exception Data control is enabled.

MME 230 may receive the Update Location Response and send an Initial Context Setup Attach Accept message to eNB 220 (FIG. 7, 750), which may then be forwarded to UE 110 (as shown by the dotted lines in FIG. 7). UE 110 may then transmit data via network 140 using non-prioritized access (block 630). That is, since UE 110 requested a non-prioritized access request, MME 230 accepted the non-prioritized access request and a standard network connection may be used for the data session involving UE 110.

Assume that UE 110 later sends another RRC Connection Request message to eNB 220 (block 640; FIG. 7, 760). In this case, assume that the RRC Establishment Cause parameter corresponds to mo-Exception Data, which indicates that UE is requesting prioritized access. eNB 220 receives the RRC Connection Request and provides an RRC Connection Setup message in a similar manner as described above with respect to signal 715 (FIG. 7, 765). UE 110 may receive the Connection Setup message and transmit a Request Setup Complete message (FIG. 7, 770) in a similar manner as described above with respect to signal 720.

UE 110 may then transmit an Initial UE message and Attach Request to MME 230 via eNB 220 (FIG. 7, 780). MME 230 may receive the Attach Request with mo-Exception Data. MME 230 may then determine whether a prioritized connection is allowed for UE 110 (FIG. 6, block 650). Continuing with the example above in which UE 110 was registered in the restricted mode, MME 230 determines that the prioritized access request is not allowed (block 650—no) and that the request is to be rejected (FIG. 7, 785). In this case, MME 230 denies the prioritized access request and transmits a reject response to UE 110 via eNB 220 (block 660, FIG. 7, 790). In some instances, UE 110 may then access network 140 in a non-prioritized basis. In other instances, the connection request may be terminated.

In the example above, UE 110 was registered as a restricted mode device and even though UE 110 transmitted a RRC Connection Request message with mo-Exception Data, network 140 determined that UE 110 was not permitted to request prioritized access and rejected the request. In this manner, network 140 and/or service provider 130 may limit prioritized access to network resources in accordance with stored device profiles.

As another example, assume that UE 110 that transmitted the initial RRC connection request at block 610 (e.g., RRC Establishment Cause corresponds to mo-Signaling) was registered by subscriber 120 as a "controlled" device that is expected to transmit mo-Exception Data at least some of the time. For example, assume that UE 110 is home security system that is expected to transmit mo-Exception Data during panic scenarios or when a break-in is detected.

Figure 9:
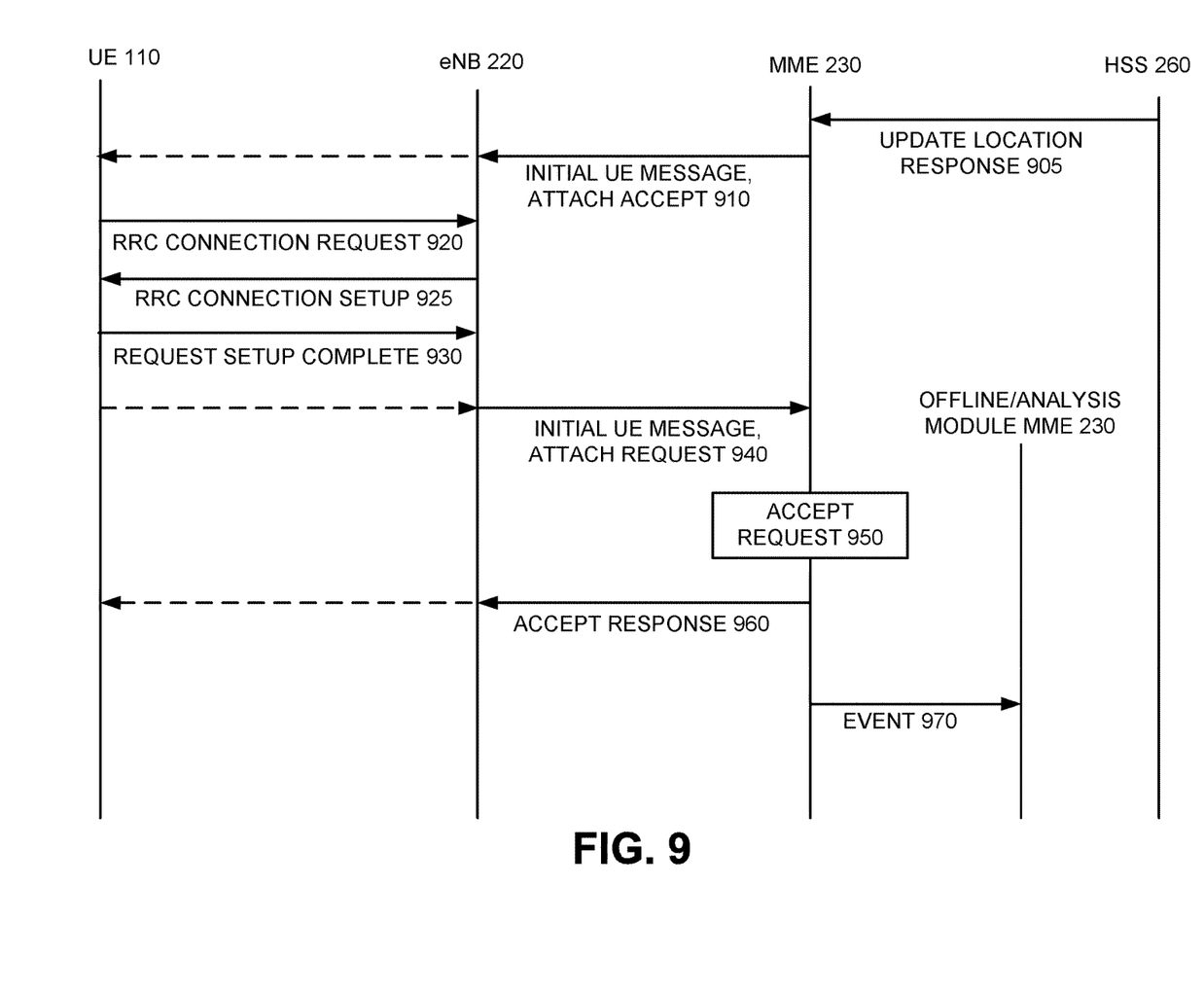
FIG. 9 is a signal flow diagram associated with the processing of FIG. 8.

In this case, processing proceeds as illustrated in FIG. 7 up through Update Location Response signal 745. However, in this scenario, the Update Location Response message indicates that UE 110 is a controlled mode device (FIG. 9, signal 905). MME 230 transmits an S1 AP Initial UE message that includes a NAS Attach Request to UE 110 via eNB 230 (FIG. 9, signal 910). Further assume that UE 110 transmits another RRC Connection Request, as illustrated at block 640 with mo-Exception Data. In this case, processing may proceed similar to that in FIG. 7. That is, UE 110 may transmit an RRC Connection Request message to eNB 220 with mo-Exception Data (FIG. 9, 920). eNB 220 may receive the RRC Connection Request and transmit and RRC Connection Setup message to UE 110 (FIG. 9, 925). UE 110 receives the RRC Connection Setup and transmits a Request Setup Complete message to eNB 220 (FIG. 9, 930).

After the setup is complete, UE 110 may transmit an S1-AP Initial UE Message and Attach Request to MME 230 via eNB 220 (FIG. 9, 940). Referring back to FIG. 6, in this example, MME 230 may then determine, based on the stored profile information, that UE 110 is a controlled mode device in which prioritized access is allowed at least some of the time (FIG. 6, block 650—yes). MME 230 may then accept the prioritized access request (FIG. 8, block 810; FIG. 9, 950). In this case, MME 230 transmits an S1-AP Accept message to UE 110 via eNB 220 (block 820, FIG. 9, 960). UE 110 may then access network 140 on a prioritized basis (block 830). In addition, in some implementations, elements of network 140, or service provider 130, may then provide an offline analysis of the access request(s) made by UE 110 (block 840). For example, if the mode of UE 110 is set to controlled and MME 230 accepts a prioritized access request (e.g., mo-Exception Data), MME 230 may transmit an event trigger to a module/device in network 140, such as an offline module of MME 230 (FIG. 9, signal 970). The offline module in MME 230 may analyze usage of UEs 110 and may trigger other processes based on the analysis. In some implementations, such as when UE 110 is an open mode device, MME 230 may not transmit an event trigger to an offline module of MME 230 for further usage analysis.

For example, if the offline/analysis module in MME 230 determines that UE 110 that has registered as a controlled device, the analysis module in MME 230 may determine whether UE 110's request for prioritized access has exceeded a predetermined limit associated with that particular UE 110. As an example, assume that a UE 110 is a home security monitoring system that is expected to transmit prioritized access requests no more than four times per month. In this case, if UE 110 has transmitted more than four prioritized access requests during the current month, the offline/analysis module in MME 230 may signal other devices in environment 100, such as HSS 260 and/or service provider 130 that the rate or number of prioritized access requests has been exceeded.

In one implementation, the characterization of UE 110 may be autonomously changed by one or more elements of environment 100. For example, HSS 260 and/or service provider 130 may receive the indication that the number or rate of prioritized access requests from UE 110 has exceeded the preset limit and automatically re-characterize UE 110. For example, HSS 260 may store information that changes the mode associated with UE 110 from "controlled" to "open." In this manner, all future prioritized access requests from UE 110 will be accepted. In other instances, HSS 260 may automatically change the mode associated with UE 110 from "controlled" to "restricted" when UE 110 has exceed the present limit or rate of prioritized access requests. In this manner, all future prioritized access requests from UE 110 will not be accepted, at least for a period of time in which the number or rate of prioritized access requests has exceeded the preset limit.

In another implementation, service provider 130 may contact subscriber device 120 to inquire whether UE 110 should be re-characterized to the "open" category with unlimited prioritized accesses. That is, if the analysis of prioritized access requests by a particular UE 110 indicates that the pattern of operation of the UE 110 does not match the registered category, service provider 130 may communicate with subscriber 120 associated with that UE 110 to determine whether subscriber 120 would like to change the category associated with that particular UE 110. In still other implementations, the offline module of MME 230 may count the number of prioritized accesses over the predetermined limit and charge the subscriber a fee for prioritized accesses above the predetermined limit for that particular UE 110. In this manner, elements in environment 100 may identify actual usage patterns and determine whether the mode or category associated with a UE 110 should be changed. In some instances, if UE 110 is not operating in accordance with its expected usage pattern/category, this may indicate a problem with UE 110. In this case, being alerted to the problem associated with the pattern of use of UE 110 may trigger subscriber 120 to replace or fix UE 110.

Implementations described herein provide for controlling prioritized access to network resources based on user device profile information. By controlling prioritized access to network resources, networks may avoid overloading networks with prioritized connections from devices that should not require prioritized access. This in turn results in less network congestion and increased network capacity. Controlling prioritized accesses also helps protect a network from intentional or mistaken use of prioritized network access requests that can limit other devices' ability to access the network. In addition, by storing information regarding expected modes of use for network devices, network service providers can more easily estimate overall network usage and capacity for planning and other purposes. In addition, by tracking usage for devices that are permitted prioritized access at some times, a network may be able to offer services for UEs 110 that more closely mirror the actual usage patterns of the UEs 110.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to identifying three modes or categories associated with different levels of attempting to obtained prioritized allocation of network resources. In other implementations, more or less modes/categories may be provided with correspondingly different requirements for obtaining prioritized allocation. For example, in another implementation, only two categories (e.g., prioritized access always allowed or always prohibited) may be used. In still other implementations, four or more modes may be provided. Still further, in some implementations, the modes/categories may be further based on network loading or congestion. For example, one mode may permit prioritized connections when network 100 is considered "lightly" loaded (e.g., operating at less than full capacity or below a certain threshold of full capacity).

In addition, features have been described with respect to registering mode information with service provider 130 and forwarding the registration/profile information to an element in network 140 (e.g., HSS 260). In other implementations, a subscriber may register his/her devices directly with elements of network 140, such as HSS 260, without the need for a transfer of information from a service provider to HSS 260.

Still further, implementations have been described herein with respect to signaling in an LTE network. In other implementations, network 140 may be another type of network with other types of UEs 110 requesting prioritized network access.

Further, implementations have been described with respect to an offline/analysis module in MME 230 analyzing prioritized requests with respect to predetermined limits for controlled mode devices. In other implementations, other devices in environment 100 or network 140, such as HSS 260, PCRF 270, etc., may perform the analysis on behalf of service provider 130.

Lastly, while series of acts have been described with respect to FIGS. 6 and 8, and signal flows with respect to FIGS. 7 and 9, the order of the acts and signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving information for a plurality of user equipment (UE) devices, wherein the information identifies, for each UE device of the plurality of UE devices, a category, of a plurality of categories, associated with network access priority for each of the UE devices, wherein a first one of the plurality of categories allows no prioritized network accesses for the UE device, a second one of the plurality of categories allows some prioritized network accesses for each of the UE devices, and a third one of the plurality of categories allows unlimited prioritized network accesses for each of the UE devices;
storing a profile for a subscriber, wherein the profile includes:
authentication information associated with the subscriber,
a list of one or more UE devices, of the plurality of UE devices, associated with the subscriber, wherein the one or more UE devices includes a first UE device, and
for each of the one or more UE devices, a type of the UE device and the category associated with the network access priority for the UE device;
receiving, on behalf of the first UE device, a UE message to establish a network connection corresponding to a request for prioritized network access;
determining, from the profile associated with the subscriber, a category for the first UE device;
allowing prioritized network access to the first UE device, in response to determining that the category for the first UE device corresponds to the second category or the third category; and
denying prioritized network access to the first UE device in response to determining that the category for the first UE device corresponds to the first category.

2. The method of claim 1, further comprising:
storing the profile for the subscriber in a memory accessible by a home subscriber server (HSS).

3. The method of claim 2, further comprising:
forwarding an update location response message from the HSS to a mobility management entity (MME), wherein the update location response message identifies the category for the first UE device.

4. The method of claim 3, wherein the update location response message further identifies a rate or percentage of prioritized network accesses associated with the second category.

5. The method of claim 3, wherein determining a category for the first UE device comprises:
identifying, by the MME, the category for the first UE device based on the update location response message.

6. The method of claim 1, wherein allowing prioritized network access to the first UE device comprises:
determining that the category for the first UE device corresponds to the second category and a number or rate of prioritized access requests for the first UE device has not exceeded a predetermined limit.

7. The method of claim 6, further comprising:
automatically changing the category associated with the first UE device from the second category to the third category in response to determining that the number or rate of prioritized access requests has exceeded the predetermined limit.

8. The method of claim 1, further comprising:
analyzing prioritized access requests for the first UE device;
determining a pattern of operation for the first UE device; and
communicating with a customer device in response to determining that the pattern of operation does not match the category for the first UE device.

9. The method of claim 1, further comprising:
providing, to the subscriber, an interface associated with registering the one or more UE devices associated with the subscriber;
receiving, via the interface, information identifying at least one of the type of UE device or a mode of operation for each of the one or more UE devices to be registered; and
storing category information identifying one of the first category, second category or third category for each of the one or more UE devices to be registered based on the information received via the interface.

10. The method of claim 1, wherein the plurality of UE devices are narrow band, Internet of Things devices operating in accordance with the 3rd Generation Partnership Project specification.

11. A system, comprising:
a memory; and
at least one device configured to:
receive information for a plurality of user equipment (UE) devices, wherein the information identifies a category, of a plurality of categories, associated with network access priority for each UE device of the plurality of UE devices, wherein a first one of the plurality of categories allows no prioritized network accesses for the UE device, a second one of the plurality of categories allows some prioritized network accesses for the UE device, and a third one of the plurality of categories allows unlimited prioritized network accesses for the UE device,
store, in the memory, a profile for a subscriber, wherein the profile includes:
authentication information associated with the subscriber,
a list of one or more UE devices, of the plurality of UE devices, associated with the subscriber, wherein the one or more UE devices includes a first UE device, and
for each of the one or more UE devices, a type of the UE device and the category associated with the network access priority for the UE device;
receive, on behalf of the first UE device, a UE message to establish a network connection corresponding to a request for prioritized network access,
determine, from the profile associated with the subscriber, a category for the first UE device,
allow prioritized network access to the first UE device, in response to determining that the category for the first UE device corresponds to the second category or the third category, and
deny prioritized network access to the first UE device in response to determining that the category for the first UE device corresponds to the first category.

12. The system of claim 11, wherein the at least one device comprises a mobility management entity (MME) device and a home subscriber server (HSS), wherein the HSS is configured to:
store the profile for the subscriber in the HSS.

13. The system of claim 12, wherein the HSS is further configured to:

forward an update location response message to the mobility management entity (MME), wherein the update location response message identifies the category for the first UE device.

14. The system of claim 13, wherein when determining a category for the first UE device, the MME is configured to:
identify the category for the first UE device based on the update location response message.

15. The system of claim 11, wherein when allowing prioritized network access to the first UE device, the at least one device is configured to:
determine that the category for the first UE device corresponds to the second category and a number or rate of prioritized access requests has not exceed a predetermined limit.

16. The system of claim 11, wherein the at least one device is further configured to:
provide, to the subscriber, an interface associated with registering the one or more UE devices associated with the subscriber;
receive, via the interface, information identifying at least one of the type of UE device or a mode of operation for each of the one or more UE devices to be registered; and
store category information identifying one of the first category, second category or third category for each of the one or more UE devices to be registered.

17. The system of claim 15, wherein the at least one device is further configured to:
automatically change the category associated with the first UE device from the second category to the third category in response to determining that the number or rate of prioritized access requests has exceeded the predetermined limit.

18. The system of claim 11, wherein the at least one device is further configured to:
analyze prioritized access requests for the first UE device,
determine a pattern of operation for the first UE device, and
communicate with a customer device in response to determining that the pattern of operation does not match the category for the first UE device.

19. A non-transitory computer-readable medium having stored thereon sequences of instructions which, when executed by at least one processor, cause the at least one processor to:
receive, on behalf of a first one of a plurality of user equipment (UE) devices, a connection request message to establish a network connection corresponding to a request for prioritized network access;
transmit, to a device, an update location request message associated with the first UE device;
receive, from the device and in response to the update location request message, an update location response message, wherein the update location response message identifies a category of a plurality of categories for the first UE device, wherein a first one of the plurality of categories allows no prioritized network accesses for the first UE device, a second one of the plurality of categories allows some prioritized network accesses for the first UE device, and a third one of the plurality of categories allows unlimited prioritized network accesses for the first UE device, wherein the device stores a profile associated a subscriber associated with with the first UE device, and wherein the profile includes authentication information associated with the subscriber and the category for the first UE device;
determine, based on the update location response message, the category for the first UE device;
allow prioritized network access to the first UE device, in response to determining that the category for the first UE device corresponds to the second category or the third category; and
deny prioritized network access to the first UE device in response to determining that the category for the first UE device corresponds to the first category.

20. The non-transitory computer-readable medium having of claim 19, wherein the instructions further cause the at least one processor to:
analyze prioritized network access requests for the first UE device;
determine a pattern of operation for the first UE device; and
communicate with a customer device in response to determining that the pattern of operation does not match the category for the first UE device.

* * * * *